No. 787,021. PATENTED APR. 11, 1905.
W. BIBER.
DEVICE FOR PRESERVING BREAD.
APPLICATION FILED JAN. 17, 1905.
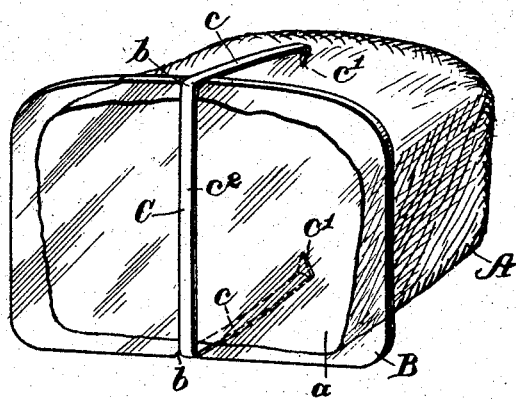
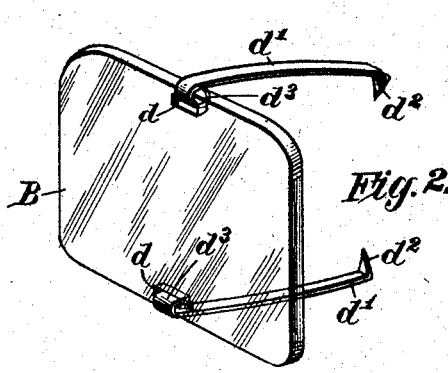
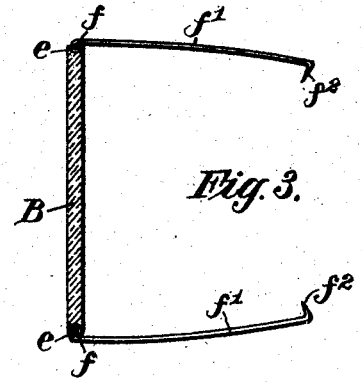
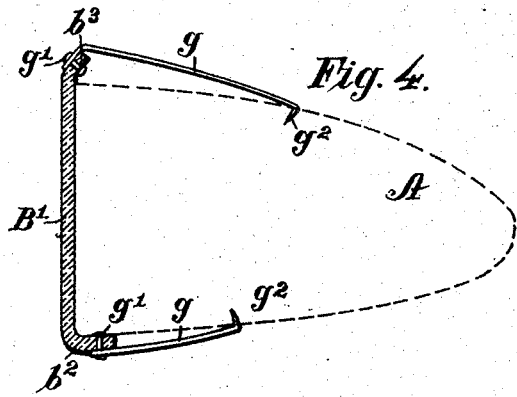
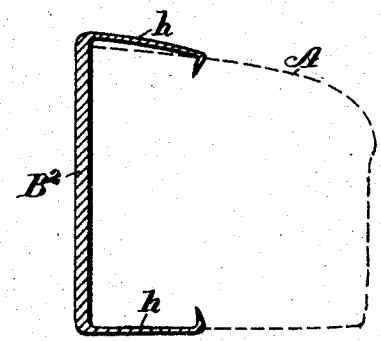
Witnesses:
A. R. Hunter
Archibald Young
Inventor
Wilhelm Biber
By Rob't P. Harris
Attorney No. 787,021. Patented April 11, 1905.

UNITED STATES PATENT OFFICE.

WILHELM BIBER, OF WASHINGTON, DISTRICT OF COLUMBIA.

DEVICE FOR PRESERVING BREAD.

SPECIFICATION forming part of Letters Patent No. 787,021, dated April 11, 1905.

Application filed January 17, 1905. Serial No. 241,487.

*To all whom it may concern:*

Be it known that I, WILHELM BIBER, a citizen of the German Empire, residing at Washington, District of Columbia, have invented certain new and useful Improvements in Devices for Preserving Bread, of which the following is a specification.

The invention to be hereinafter described relates to the preservation of bread, and more particularly to devices which when applied to the bread will exclude the air from the cut surface thereof and prevent such surface from becoming stale, dry, and hard.

It is a well-known fact that when a loaf of bread has had one or several slices cut therefrom the exposed cut surface of the loaf rapidly parts with its moisture by evaporation. Thus in the course of a short time the exposed cut surface becomes dry and hard and assumes the character generally denominated "stale." This stale character penetrates to a more or less extent into the body of the loaf, according to the time of exposure, the character of the surrounding atmosphere, and like conditions, so that upon again slicing the bread one or more slices at or adjacent to the previously-exposed cut surface must be removed and laid aside as not fit for the intended use before that portion of the loaf is reached that affords "fresh" bread. Obviously much waste and loss occurs from this cause; and the object of the present invention is to provide a device which can be readily attached to and detached from the loaf and which when in attached position will substantially prevent the evaporation referred to and the consequent drying and hardening of the cut surface.

With these generally-stated objects in view the present invention consists of the parts and combinations hereinafter described and definitely set forth in the claims.

In the drawings, Figure 1 is an illustration of one form of the present invention, showing the same in position upon a loaf of bread. Fig. 2 illustrates in perspective view another form the device may assume, and Figs. 3, 4, and 5 are cross-sectional views of still further modifications.

Referring to Fig. 1, A represents a loaf of bread, which may be of any usual or desired shape and from which one or more slices of bread have been cut, leaving the exposed cut surface $a$. Under usual conditions after a loaf of bread has been cut, as specified, it is laid aside until such time as a further supply of slices of bread is demanded, the exposed cut surface $a$ in the meantime becoming dry and hard or stale, owing to the evaporation that readily takes place at the moist cut surface. Under these conditions the first slice cut from the loaf is found to be too stale for use as fresh bread and must either be laid aside for some secondary use or thrown away altogether. The device of the present invention is constructed and adapted to overcome the objections and loss referred to and consists, primarily, of a plate B, which may be formed of any suitable material having a plane smooth surface for contacting with the cut surface $a$ of the bread and means for detachably holding the said plate in close contact with said surface to thereby exclude the air therefrom. The plate B in the embodiment of the invention illustrated, Fig. 1, is preferably formed of glass of suitable size and general contour adapting it to completely cover and protect the cut surface of the loaf, and as a means for detachably securing in place the said plate, which for identification may be denominated a "bread-protecting" plate, I provide the upper and lower edges of the plate with recesses $b$ $b$, which are engaged by a fastening device (designated as a whole by C) comprising spring clips or fingers $c$ $c$, terminating at their ends in the penetrating points $c'$ $c'$, the said clips or fingers $c$ $c$ being connected by a band or cross-piece $c^2$ extending across the exposed surface of the bread-protecting plate. From this construction it will be noted that the bread-protecting plate B can be readily attached to the cut loaf by simply pressing the plate firmly against the cut surface $a$, and the points of the spring clips or fingers $c$ $c$ at such time engaging the surface or crust of the loaf will securely hold the plate in position to prevent substantial evaporation from the cut surface $a$. When the bread-protecting plate is thus in position, not only will air be practically excluded from circulating over the surface $a$, but such surface will be protected from dust, dirt, and so on. When it is desired to remove the plate B to enable slices of bread to be cut, it is only necessary to raise the spring clips or fingers from engagement with the loaf.

Fig. 2, for instance, shows the plate B provided with the slots or openings $d\ d$ for securing the clips or fingers $d'\ d'$ to the bread-protecting plate, said clips or fingers having the engaging points $d^2\ d^2$ to penetrate the surface or crust of the bread. In this case the clips or fingers have their ends $d^3$ passed through the openings $d\ d$ and turned into the form of a hinge-joint, as will be apparent.

In Fig. 3 the bread-protecting plate is shown provided with an edge groove $e$, in which is secured a wire or encircling band $f$, on which wire or band $f$ the clips or fingers $f'\ f'$ are mounted in any approved manner, the points $f^2\ f^2$ thereof acting as in the previously-described cases to engage the surface or crust of the loaf to hold the plate in position.

In Fig. 4 the form of the bread-protecting plate $B'$ is modified so as to present at the lower portion a flange $b^2$. A similar or smaller flange may be formed at the upper edge of the plate, as at $b^3$, and to these flanges the clips or fingers $g\ g$ may be secured by any usual means, as the pins or rivets $g'\ g'$. In this case the lower surface of the loaf A rests on the flange $b^2$, as shown, and the points $g^2\ g^2$ of the clips or fingers engage the loaf, as will be understood.

In Fig. 5 the bread-protecting plate $B^2$ is still further modified and has the clips or fingers $h\ h$ formed integral therewith, the parts being otherwise secured in position upon the loaf as indicated.

Any of these various forms of the plate or clips may be employed, or these parts and their manner of connection may be variously modified in other ways without in any wise departing from the spirit of the invention.

What I claim, and desire to secure by Letters Patent, is—

1. A device for the preservation of bread, comprising a bread-protecting plate adapted to be applied to the cut surface of the loaf to exclude the action of air therefrom and a fastening device for directly engaging the loaf of bread to detachably hold the bread-protecting plate in position covering and in close contact with the cut surface.

2. A device for the preservation of bread, comprising a bread-protecting plate having a plane surface adapted to be held in close contact with and cover the cut surface of the loaf to exclude air therefrom, and a fastening device secured to the bread-protecting plate, and adapted to engage the loaf for detachably holding the plate in said position against the cut surface.

3. A device of the character described for the preservation of bread, comprising a bread-protecting plate having a plane surface adapted to contact with and cover the cut surface of the loaf to exclude air therefrom, and a fastening device secured to the bread-protecting plate, said fastening device having engaging points to penetrate the crust-surface of the bread to detachably hold the plate in position against the cut surface of the bread.

In testimony whereof I affix my signature in presence of two witnesses.

WILHELM BIBER.

Witnesses:
F. H. SMERBITZ,
S. BIBER.